I. MORLEY.
Brick-Machine.
No. 203,756. Patented May 14, 1878.
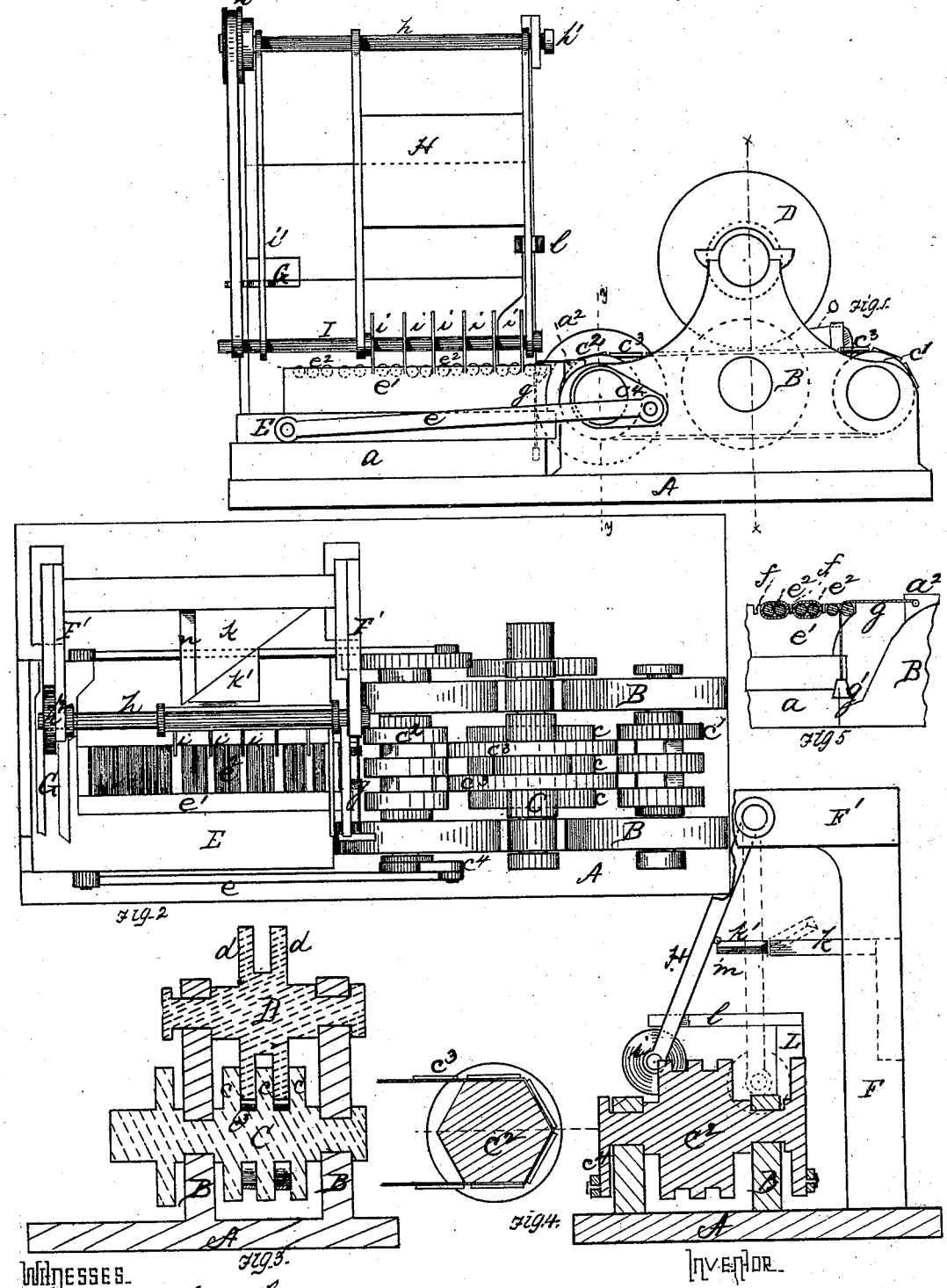

UNITED STATES PATENT OFFICE.

ISAAC MORLEY, OF PITTSBURG, PENNSYLVANIA.

IMPROVEMENT IN BRICK-MACHINES.

Specification forming part of Letters Patent No. 203,756, dated May 14, 1878; application filed April 22, 1878.

*To all whom it may concern:*

Be it known that I, ISAAC MORLEY, of Pittsburg, in the county of Allegheny and State of Pennsylvania, have invented a new and useful Improvement in Brick-Machines; and I do hereby declare the following to be a full, clear, and exact description thereof, reference being had to the accompanying drawing, forming part of this specification, in which—

Figure 1 is a side elevation of a brick-machine embodying my invention. Fig. 2 is a top or plan view of the same, the pressure-wheel having been removed. Fig. 3 is a transverse section on the line $x\ x$. Fig. 4 is a similar section on the line $y\ y$, showing the operation of the cutters. Fig. 5 is a detailed sectional view, showing the manner of supporting the strips of pressed clay during the travel of the carriage.

Like letters refer to like parts wherever they occur.

My invention relates to the construction of machines for the manufacture of bricks, tiles, &c.; and consists, first, in the combination, with devices which mold the clay into continuous strips, of a reciprocating carriage or truck adapted to receive the molded strips and present them to the cutters, which sever the mass into bricks, tiles, &c.; secondly, in the combination, with a reciprocating truck or carriage, which receives and supports the strip of molded clay, of one or more saws or cutters adapted to move with as well as across the truck during their operation, whereby a continuous operation of the machine is provided for; and, finally, in details of construction, hereinafter more specifically set forth.

The object of my invention is to simplify and cheapen the mechanism required in the construction of continuously-acting brick-machines, and to render the same durable, exact, and effective.

I will now proceed to describe my invention, so that others skilled in the art to which it appertains may apply the same.

Upon a suitable bed or foundation, A, I erect a frame or housings, B, adapted to support the pressure or molding devices. Journaled in the frame B is a roll, C, having flanges $c\ c\ c$ at such distance apart as the articles to be formed, either brick or tile, demand. This roll C is usually the driven roll. Journaled in frame B, on both sides of roll C, and preferably in the same horizontal plane, are two or more polygonal pulleys, $c^1\ c^2$, preferably hexagonal, octagonal, or some form having an even number of sides. These pulleys $c^1\ c^2$ carry an endless belt, $c^3$, preferably formed of sections, which belt $c^3$ passes over flanged roll C and rests thereon, the carrier or endless belt $c^3$ and flanges of roll C forming the bottom and sides of an open mold.

The carrier or endless belt $c^3$ may be composed, if desired, of metal plates jointed together, the size (width and length) of said plates being determined by the distance between the flanges of roll C and the nature of the article to be formed, as before specified.

Journaled in the main frame B, over roll C, is a second roll, D, whose flanges or collars $d\ d$ work between the flanges of the under roll C. This roll D I term the "press" or "presser-roll," as it is employed to roll down or compact the clay.

It is evident where a single strip is to be formed a plain roll, working between the flanges of the lower roll, will be used. It is usually set to turn by friction from the clay or driven roll C, and its flanges correspond in thickness to the distance between the flanges $c\ c\ c$ of the under roll.

A series of guides, $o$, are usually placed over the endless belt of bottom boards, for the purpose of guiding the clay between the flanges of the rolls C D; and over the guides $o$ a suitable hopper may be placed, provided with a plunger, if desired, for supplying the clay which has been previously prepared.

Arranged in and moving on ways $a\ a$ of bed A is a truck or carriage, E, which receives its motion from a crank-arm, $c^4$, on the shaft of pulley $c$, through a rod or pitman, $e$, whereby said truck completes its travel to and from the main frame B at each revolution of the pulley. Secured on the carriage E, in line with the devices which mold the clay, is a frame, $e^1$, in which are journaled in sets a series of rollers, $e^2$, adapted to sustain the clay and present it to the action of the cutters; and, in order that the cutters may work transversely across the clay-rest between and below the set of rollers $e^2$, the frame $e^1$ is notched upon one side, as at $f$. Each set of rollers $e^2$, corresponding to a brick or tile located between the knives or saws, may be provided with its own belt, if desired. Secured to a cross-bar, $a^2$, on the main frame B are a series of tapes, $g$, which pass over the first roller, $e^2$, of frame $e^1$, and are weighted at their free ends, as at $g'$, thus forming an extensible support between the endless belt $c^3$ of bottom boards and the rest $e^1$, for sustaining the clay during the travel of truck E.

Erected on the bed or foundation A, at one side of the ways for truck E, are uprights F, for the support of the saws or cutting devices and their operating mechanism. Projecting from uprights F are arms F', in which is journaled a shaft, $h$, provided at each end with a pulley, one, $h^1$, for receiving, and the other, $h^2$, for communicating, power. Suspended so as to be freely movable on shaft $h$ is a hanger, H, in the lower extremity of which is journaled a shaft, I, carrying a series of saws, $i$, corresponding in number to the sides of the polygon used to form pulley $c^2$. This shaft I receives its motion by means of a belt from pulley $h^2$. In order to sustain the outer end of shaft I an independent hanger or link, $i^1$, is provided, while a slotted arm, G, controls the independent hanger $i$ and belt of pulley $h^2$. Attached to the uprights F is an inclined cam-surface, $k$, over which slides a similar cam, $k'$, secured to the hanger H, the latter being hinged to the hanger, and beveled on its rear face, as at $m$, so that it will rise and slide over fixed cam $k$ on the return movement of the hanger H. The cam $k$ is also beveled at $n$, to facilitate the return of cam $k'$. To cause the hanger H and its saws to travel with the frame $e^1$, and consequently at the same rate of speed as the molded clay to be cut, one pendant of the hanger works in a slotted arm or bar, $l$, secured to a post, L, erected on the truck or carriage E.

If it is deemed advisable to drive the pulley $c^2$, from which the truck E is driven, a belt may be passed from a pulley on the roll C to a pulley on the same shaft as the polygonal pulley $c^2$.

The operation of my devices is as follows: Power being applied to roll C, and clay, suitably prepared, being fed from a hopper onto the endless belt $c^3$ of bottom boards, the clay will be drawn or carried through the grooves of roll C, and, being compressed therein by the flanges of roll D, will issue therefrom in the form of continuous strips of compressed clay, which will pass on to the rollers $e^2$ of frame $e^1$, to be severed into bricks, tiles, &c., by the cutting devices. The figure of the pulley $c^2$ will determine the amount of clay (or length of strip) fed on the frame $e^1$ at each turn, and the number of cutters employed should correspond. For instance, the pulley shown in the drawing is a hexagon, and the number of cutters six. As the truck E is driven from a crank on the pulley $c^2$ it will move from frame B during one half of the revolution of the pulley, or while clay equivalent to three bricks (or like articles) is advancing, and return during the other half of the revolution of $c^2$, or while material for three more bricks is advancing, the material thus projected being sustained on the extensible supports $g$ during the movement of truck E away from B, and sliding over the rollers $e^2$ into position before the cutters on the return travel of E. Thus when the truck commences its movement it has material thereon equivalent to six articles (bricks or tiles) to be made. As the truck E moves from the frame B it carries with it the sliding hanger H, in which the cutters are journaled, and as the cam $k'$ thereon comes in contact with the cam $k$ of the uprights F the hanger H is swung out, causing the cutters to traverse the frame $e^1$ transversely as well as to move therewith. The cutting disks or saws $i$, being revolved by belt from pulley $h^2$, sever the strips into regular and uniform sections. At the time or just before the truck E reaches the extremity of its travel the cam $k'$ passes or escapes from cam $k$, hanger H falls back to a perpendicular, and, as the hanger H travels back with the truck E and frame $e^1$, the hinged cam $k'$ swings up and rides over the fixed cam $k$, and drops back into place, ready for the next forward movement of the truck E. At the time the hanger H falls back to the perpendicular the saws or cutting-disks follow it, leaving the rollers $e^2$ of frame $e^1$ clear for the advance of the strip which slides forward thereon as the truck returns to its first position, ready to repeat the operations specified.

The advantages of my invention are the simplicity of the devices, their durability, and the readiness with which they can be repaired or replaced, the rapidity, accuracy, and effectiveness of their operation, the ease and readiness with which the machine can be inspected, and the great saving of power in operating the machine.

Having thus described my invention, what I claim, and desire to secure by Letters Patent, is—

1. The combination of the flanged rolls, the presser-roll, the endless belt or carrier, and the reciprocating carriage, substantially as and for the purpose specified.

2. The combination, with the reciprocating truck or carriage, of the suspended saws or cutting-disks, adapted to travel with and across the truck, substantially as and for the purpose specified.

3. The combination, with the fixed molding devices for forming the continuous strips, of the reciprocating cutting carriage or truck and the interposed extensible support for the strips, substantially as specified.

4. The combination of the reciprocating truck for supporting the strip and presenting it to the cutters, the cutters carried by the sliding hanger, the cams or inclines for projecting the hanger, and the slotted arm for causing the cutters to travel with the truck, substantially as specified.

In testimony whereof I, the said ISAAC MORLEY, have hereunto set my hand.

ISAAC MORLEY.

Witnesses:
F. W. RITTER, Jr.,
R. H. WHITTLESEY.